April 19, 1938.  C. H. JOHNSON  2,114,385
LAST MEASURING STICK
Filed Nov. 7, 1935

INVENTOR.
Clarence H. Johnson
By his attorney
Victor Cable

Patented Apr. 19, 1938

2,114,385

UNITED STATES PATENT OFFICE 2,114,385

LAST MEASURING STICK

Clarence H. Johnson, Beverly, Mass., assignor to United Last Company, Portland, Maine, a corporation of Maine Application November 7, 1935, Serial No. 48,710

4 Claims. (Cl. 33—3)

The present invention relates to last measuring sticks. The ordinary last stick comprises a straight body with an upturned abutment at one end and a second parallel movable abutment sliding along the body which is graduated in ⅓-inch size intervals. In use the last is laid on the upper side of the body with its lower heel corner and its ball line in contact with the body, and calipered between the abutments by sliding the movable abutment until the ends of the last are held between the two abutments. The lower front edge of the movable abutment is then read on the graduated scale.

I have determined that the present system of grading all lasts at the rate of ⅓ inch per size is faulty in that the larger lasts thus graded are too long for optimum fit. I have found that better fitting lasts result from grading the lasts which are longer than the model last at a smaller rate per size, and I have found that a size interval of $^{29}/_{96}$ inch (⅓ inch minus $^{1}/_{32}$ inch) gives satisfactory results. For example, the model size in women's shoes being 4, I propose to grade the 3, 2 and 1 sizes ⅓", ⅔" and 1" shorter than the 4 model, respectively (as has been done in the past), and I propose to grade the 5, 6 and 7, $^{29}/_{96}$", $^{58}/_{96}$" and $^{87}/_{96}$" longer than the 4 model, respectively.

The object of the present invention is to provide a measuring stick by means of which lasts graded in this way can be measured and tested for length.

Accordingly, I have provided a last stick having fixed and movable abutments, as is usual, in which the movable abutment carries an index mark or a graduated scale, which is adjustable on the abutment, and the body carries a cooperating scale or index mark, as the case may be, the scale, in either case, being graduated in intervals of different lengths on opposite sides of its zero mark. Thus the index and the zero mark of the scale can be set together irrespective of the absolute length of the model last, and as the slidable abutment moves to caliper lasts longer and shorter than the model the differences in length between these two classes of lasts and their model will be measured in size units of different lengths as I propose.

These and other features of the invention comprising certain combinations and arrangements of parts will be apparent from the following description of a preferred embodiment of the invention shown in the drawing, in which—

Figure 1:
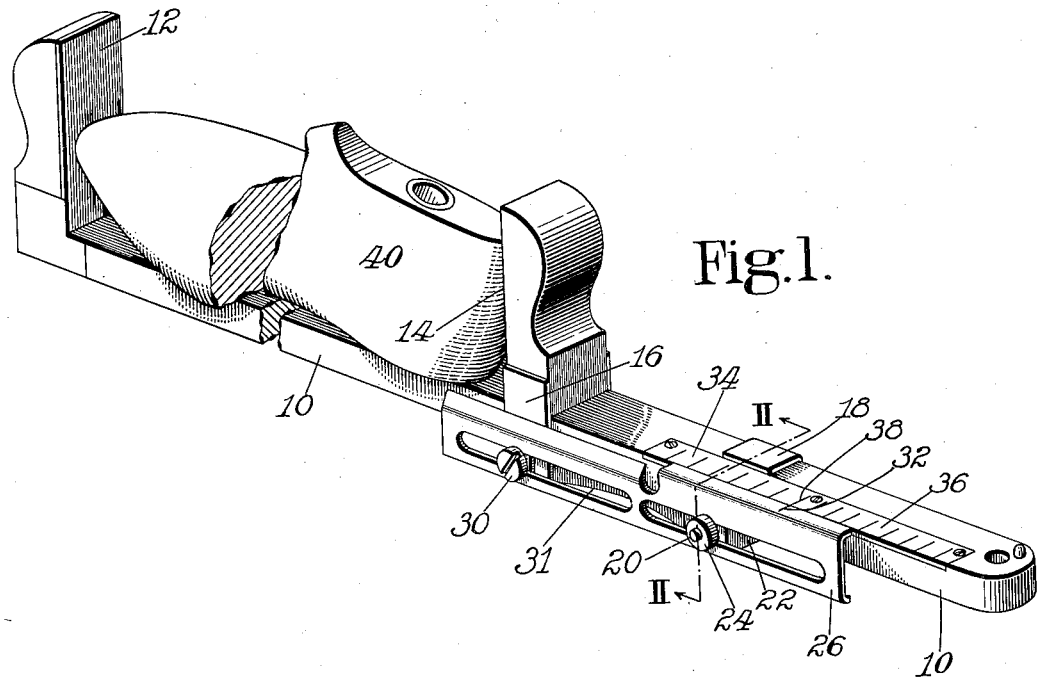
Fig. 1 is a perspective view of the stick shown as applied to a model last.
Figure 2:
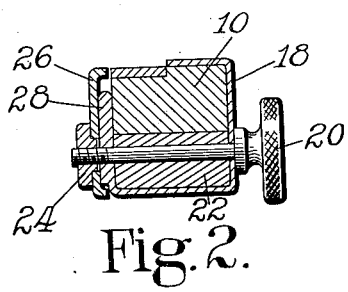
Fig. 2 is a cross-section through the mechanism which clamps the adjustable member to the movable abutment.

The illustrated stick comprises a straight body 10 of rectangular cross-section having an integral abutment 12 projecting at right angles from one end. The sliding abutment 14 is integrally associated with a metal frame 16 which supports it at right angles to the body 10, and has a rearward extension 18 also embracing the stick, several inches to the rear of the front face 14 of the sliding abutment. A screw 20 extends through the extension and through a distance plate 22 located beneath the body 10, the screw 20 having a nut 24 by which a slidable slotted plate 26 can be clamped to the side 28 of the extension 18. The plate 26 is guided on a screw 30, on the frame 16, which is not set up tightly enough to clamp the plate 26. A spring 31 is mounted on the extension 18 and contacts with the body 10 to prevent undue looseness.

The plate 26, as shown, has an index mark 32 on its upper surface arranged to read against a scale 34, 36 detachably fastened on the upper side of the body 10. This scale has a zero mark 38. The portion 34 of the scale, which is in front of the mark 38 (to the left in Fig. 1), is graduated in ⅓" units; the portion 36 of the scale, to the rear of the mark 38, is graduated in $^{29}/_{96}$" units, i. e., in units of ⅓" minus $^{1}/_{32}$".

In using the stick, the model last 40 is placed on the stick and calipered in the usual way. While it is so held, the screw 20 is loosened and the plate 26 is moved relatively to the frame-extension 18, until the index mark 32 registers with the zero mark 38, as shown in Fig. 1. The screw 20 is then tightened. This does not affect the slidability of the abutment 14.

If now the abutment 14 is slid forward toward the abutment 12 to caliper a last shorter than the model 40, the index 32 will move over the scale 34 and the deficiency in length of the shorter last as compared with the model 40 will be measured in ⅓" size units. If, on the other hand a longer last of the same style be calipered, the index 32 will read on the scale 36, and the excess in length of the last over the model will be measured in $^{29}/_{96}$" units.

Thus, all lasts graded in accordance with the system described above can be easily and conveniently measured and tested in length by means of the illustrated stick.

The disclosed $^{1}/_{32}$" per size deficiency in the size interval used for lasts longer than the model is to be regarded as merely illustratory. The point is that the stick shall be useful in measuring lasts in different size intervals above and below the model length, respectively.

Having described my invention, what I claim as new and desire to secure by Letters Patent of the United States is:

1. A last measuring stick having a body, and fixed and movable calipering abutments, the movable abutment and the body carrying indicating members comprising an associated index mark and graduated scale, one of said associated members being adjustable relatively to the element that carries it, whereby the index mark may be set to the zero mark of the scale irrespective of the absolute length of a model last calipered by the stick, the scale being graduated in both directions from its zero mark, and the graduation intervals being different on opposite sides of the zero mark.

2. A last measuring stick having a body, and fixed and movable calipering abutments, the movable abutment and the body carrying indicating members comprising an associated index mark and graduated scale, one of said associated members being adjustable relatively to the element that carries it, whereby the index mark may be set to the zero mark of the scale irrespective of the absolute length of a model last calipered by the stick, the scale being graduated in both directions from its zero mark, and the graduation intervals being uniform, but different, on opposite sides of the zero mark.

3. A last measuring stick having a body, and fixed and movable calipering abutments, the movable abutment carrying an adjustable index mark and the body carrying a graduated scale to cooperate with the index mark, whereby, irrespective of the absolute length of a model last on the stick, the index mark may be set to the zero mark of the scale, the scale being graduated in standard ⅓" units on that side of the zero mark where it will cooperate with the index mark, set as described, when a last shorter than the model is on the stick, and graduated in intervals other than ⅓" on the other side of the zero mark, where it cooperates with the index when a last longer than the model is on the stick.

4. A last measuring stick having a body, and fixed and movable calipering abutments, the movable abutment carrying an adjustable index mark and the body carrying a graduated scale to cooperate with the index mark, whereby, irrespective of the absolute length of a model last on the stick, the index mark may be set to the zero mark of the scale, the scale being graduated in standard ⅓" units on that side of the zero mark where it will cooperate with the index mark, set as described, when a last shorter than the model is on the stick, and graduated in intervals shorter than ⅓" on the other side of the zero mark, where it cooperates with the index when a last longer than the model is on the stick.

CLARENCE H. JOHNSON.